United States Patent
Deisinger et al.

(10) Patent No.: US 8,740,713 B2
(45) Date of Patent: Jun. 3, 2014

(54) FOLDING BELLOWS ARRANGEMENT FOR A TRIPOD JOINT UNIT

(71) Applicant: GKN Driveline International GmbH, Lohmar (DE)

(72) Inventors: Markus Deisinger, Sieburg (DE); Claude Neviani, Mezy (FR)

(73) Assignee: GKN Driveline International GmbH, Lohmar (DE)

( * ) Notice: Subject to any disclaimer, the term of this patent is extended or adjusted under 35 U.S.C. 154(b) by 0 days.

(21) Appl. No.: 13/867,305

(22) Filed: Apr. 22, 2013

(65) Prior Publication Data

US 2013/0237332 A1 Sep. 12, 2013

Related U.S. Application Data

(63) Continuation of application No. PCT/EP2010/006437, filed on Oct. 21, 2010.

(51) Int. Cl.
*F16D 3/84* (2006.01)

(52) U.S. Cl.
USPC .......................................... 464/175; 464/905

(58) Field of Classification Search
USPC ................... 464/173–175, 905; 277/635, 636
See application file for complete search history.

(56) References Cited

U.S. PATENT DOCUMENTS

| | | | | |
|---|---|---|---|---|
| 5,026,323 A | * | 6/1991 | Fukumura et al. | 464/175 |
| 6,695,706 B2 | * | 2/2004 | Furuta | 464/175 |
| 7,338,383 B2 | * | 3/2008 | Toriumi et al. | 464/175 |

* cited by examiner

*Primary Examiner* — Gregory Binda
(74) *Attorney, Agent, or Firm* — Bejin, VanOphem & Bieneman PLC

(57) ABSTRACT

A folding bellows arrangement, e.g., for a tripod joint unit, may comprise a joint outer part with a groove, a folding bellows with a joint collar region for attachment to said joint outer part, and an adapter ring. The joint collar region may comprise a joint binder seat region. The adapter ring may have an inner surface that is matching in a cross section to an outer contour of the joint outer part. On an inner area of the joint collar region and within the joint binder seat region of the folding bellows, at least one bead may be arranged. The bead matching a groove may be arranged on an outer area of the adapter ring. The groove of the adapter ring may correspond to at least one first sealing lip arranged on an inner area of the adapter ring, and at least one second sealing lip may be arranged on the inner area of the adapter ring. The first and second sealing lips may be arranged within the groove of the joint outer part.

11 Claims, 4 Drawing Sheets

FOLDING BELLOWS ARRANGEMENT FOR A TRIPOD JOINT UNIT

TECHNICAL FIELD

The present disclosure relates to a folding bellows arrangement for a tripod joint unit, comprising a joint outer part with a groove, a folding bellows with a joint collar region for attachment to said joint outer part, and an adapter ring.

BACKGROUND

Constant velocity joints being state of the art conventionally have, at their joint outer part, three radial depressions which are indicated on the periphery. The outer contour of the joint casing which is created in this way, is referred to as tri-lobed, so that reference is generally made to tripod joints or tri-lobed constant-velocity joints. Said joints comprise an adapter and/or bellows, thus forming an arrangement which is sealed in order to prevent infiltration of dirt and moisture as well as to prevent a grease filling of the joint component from escaping. It is known that said arrangements comprise a folding bellows having a collar region, which faces towards a joint housing outer part, with an equal inner diameter, and, further, said adapter to be combined with said folding bellows, the adapter being integrally formed with its inner side on the tri-lobed outer contour of the joint housing, while the outer side of said adapter comes in contact with the inner side of the corresponding collar region of the folding bellows. Such arrangements are known as two-piece sealing systems due to the presence of said adapter as well as said folding bellows.

One problem connected with the use of arrangements comprising an adapter as well as a folding bellows is that additional surfaces are provided for, so that sealing and fixation of such arrangements is complicated when compared with one-piece arrangements. Due to the necessity to provide for additional sealing and fixation means, the total diameter of the whole arrangement is higher than the total diameter of one-piece arrangements. However, space is one of the most important parameters in the joint area, especially in the automotive area, so that a need to provide for a folding bellows arrangement with decreased total diameter exists.

SUMMARY

A folding bellows arrangement for a tripod joint unit with a decreased total diameter is proposed herein. One exemplary configuration of a folding bellows arrangement comprises a joint outer part with a groove, a folding bellows with a joint collar region for attachment to said joint outer part, and an adapter ring. The joint collar region comprises a joint binder seat region. The adapter ring has an inner surface that is matching in a cross section to an outer contour of said joint outer part. On an inner area of said joint collar region and within said joint binder seat region of said folding bellows at least one bead is arranged. The bead matches a groove arranged on an outer area of the adapter ring. The groove of the adapter ring corresponds to an at least one first sealing lip arranged on an inner area of said adapter ring. On the inner area of the adapter ring at least one second sealing lip is arranged. The first and second sealing lips are arranged within the groove of the joint outer part.

Advantageously, the exemplary arrangement provides for a lower total diameter of the arrangement than compared with a usual two-piece arrangements by integrating the first and second sealing lips arranged on the inner area of the adapter ring within the groove of the joint outer part. The first and second sealing lips are arranged on the inner area of the adapter ring, the inner area corresponding to an area of the adapter ring being located generally opposite the groove of the joint outer part when the folding bellows arrangement in accordance with an exemplary arrangement is mounted. Sealing, as well as fixation of the arrangement, thus, takes place over the surface of the groove of said joint outer part.

An exemplary arrangement of the bellows may further comprise a binder element for fixation of the folding bellows as well as the adapter on the joint outer part. Binder elements are known from the prior art. Each kind of binder element may be used in accordance with the exemplary embodiments, especially the binder element may be embodied as a clamping strap, a clamp, or a compression ring. Further, in one exemplary configuration, the arrangement disclosure herein may also comprise a shaft to which said fastening bellows is attachable by way of a further binder element as described before.

In one exemplary embodiment, at least two second sealing lips are arranged on said inner area of said adapter ring. In one exemplary arrangement, two or three or four second sealing lips may be arranged on the inner area of the adapter ring opposite said groove of said joint outer part. In another exemplary arrangement, the first sealing lip is arranged between at least two second sealing lips. It is also possible and within the scope of the present disclosure, that not only one, but also two or more first sealing lips are present on the inner area of the adapter ring. If two or more first sealing lips are arranged on the inner area of said adapter ring, two or more grooves of the adapter ring correspond to the two or more first sealing lips. The second sealing lips preferably do not correspond to any groove arranged on the outer area of the adapter ring.

In one exemplary arrangement, the bead of the joint collar region may be arranged generally in the middle of the joint binder seat region. The arrangement of the at least one first sealing lip between at least two second sealing lips, and in one particular arrangement in which in addition, the bead is arranged generally in the middle of the joint binder seat region, provides for not only good sealing properties, but also good fixation properties as well as a decreased inner diameter compared to arrangements known from the prior art.

In another exemplary arrangement, the first and second sealing lips in a cross sectional view are of a generally triangular shape. Further, in another exemplary arrangement, in a cross-sectional view, the shape of the at least one first sealing lip and the at least one second sealing lip is different. Both may have a generally triangular shape in a cross-sectional view, however, the triangular shape of both of them may be deviating from each other. Further, also any other shapes in a cross-sectional view are not excluded from the scope of the present disclosure, especially, also a trapezoidal shape, half round or any other shape for the at least one first and the at least one second sealing lip is possible.

In one exemplary arrangement, in a cross-sectional view, an angle $\alpha_1$ between surfaces of two side areas of the first sealing lip forming a tip, the tip being directed towards the groove of the outer joint part, is larger than the corresponding angle $\alpha_2$ between surfaces of two side areas of the second lip. In this embodiment, both first and second sealing lips may have a triangular shape forming a tip being directed towards the groove of the outer joint part, however, angle $\alpha_1$ is larger than angle $\alpha_2$. The tip may have any shape, and may especially have a sharp peak contour or a rounded contour. In a further exemplary embodiment, the angle $\alpha_1$ of the first sealing lip is an obtuse angle. In a further exemplary embodiment, the angle $\alpha_2$ of the second lip is generally an acute angle. In one exemplary arrangement, angle $\alpha_1$ of the first sealing lip is within a range from about 100 degrees to about 150 degrees. In another exemplary arrangement, angle $\alpha_1$ is in a range from about 110 degree to about 140 degree. In one exemplary arrangement, angle $\alpha_2$ is in a range from about 60 degrees to about 105 degrees, and may further be in a range from about 80 degrees to about 98 degrees.

In another exemplary embodiment, the groove of the joint outer part has a tulip-like shape. One may also say that, in a cross-sectional view, the groove of the joint outer part has a trapezoidal shape. Both terms, tulip-like shape on the one side and trapezoidal shape on the other side, are synonymous in the sense of the present disclosure.

In a further exemplary embodiment, a height $h_1$ of an outer side wall of the groove of the joint outer part is lower than a height $h_2$ of an inner side wall. The outer and said inner side walls, in a cross-sectional view, may be configured to slant towards a ground (it may also be defined as a bottom) of the groove. In a further exemplary embodiment, a first slanting angle $\beta_1$ between the outer side wall and the ground is larger than a second slanting angle $\beta_2$ between the inner side wall and the ground. In one exemplary arrangement, the first slanting angle $\beta_1$ is in a range from about 20 degree to about 60 degree, in another exemplary arrangement, in a range from about 30 degree to about 50 degree. In yet a further exemplary arrangement, the second slanting angle $\beta_2$ is in a range from about 20 degree to about 50 degree, and may further be in a range from about 25 degree to about 45 degree.

In one exemplary arrangement, the groove of the adapter ring, in a cross-sectional view, has a trapezoidal shape, similar to the shape of the groove of the joint outer part. In one exemplary arrangement, slanting angles between the ground or bottom of the groove of the adapter ring of inner and outer side walls of the groove of the adapter ring are generally equal with each other. In one exemplary configuration, slanting angles defined by the ground of the groove of the adapter ring and surfaces of the inner and outer side walls are in a range from about 20 degree to about 60 degree, and in one exemplary arrangement, in a range from about 30 degree to about 50 degree.

The at least one bead arranged on an inner area of the joint collar region of the folding bellows and within the joint binder seat region, is embodied as a circumferential bead. However, the bead may also be embodied as a bead element, thus several bead elements may be arranged on an inner surface of the joint collar region of the folding bellows.

In one exemplary embodiment, a slit, such as a circumferential embodied slit, is arranged on an outer surface of the joint collar region, and in one exemplary arrangement further corresponds to the bead. In turn, the slit may also be embodied as a slit element, thus, several slit elements may be arranged on an outer surface of the joint collar region circumferentially. The slit or slit elements correspond to the bead or head elements arranged on the inner surface of the joint collar region, e.g. they are arranged essentially opposite to each other.

In a further exemplary embodiment, only one bead, which may be configured as a circumferential bead, is arranged on the inner surface of the joint collar region, corresponding to one slit, such as, for example, a circumferential slit, arranged on the outer surface of the joint collar region. However, it may also be possible that two beads, such as circumferential beads, as well as two corresponding slits, such as circumferential slits, are arranged in the joint collar region. In such an embodiment, two corresponding grooves of the adapter ring are arranged for reception of the beads in the mounted arrangement in accordance with an exemplary embodiment.

The present disclosure also refers to an adapter ring as described above, especially an adapter ring for use in a tripod joint unit, and especially in the folding bellows arrangement as described before.

Other advantages and features become apparent to one of skill in the art reading the following description with reference to the drawings illustrating features of the disclosure by way of example.

BRIEF DESCRIPTION OF THE DRAWINGS

For more complete understanding of this disclosure, reference should now be made to the embodiments illustrated in greater detail in the accompanying drawings and described below by way of examples of the disclosure.

In the drawings.

DETAILED DESCRIPTION

Figure 1:
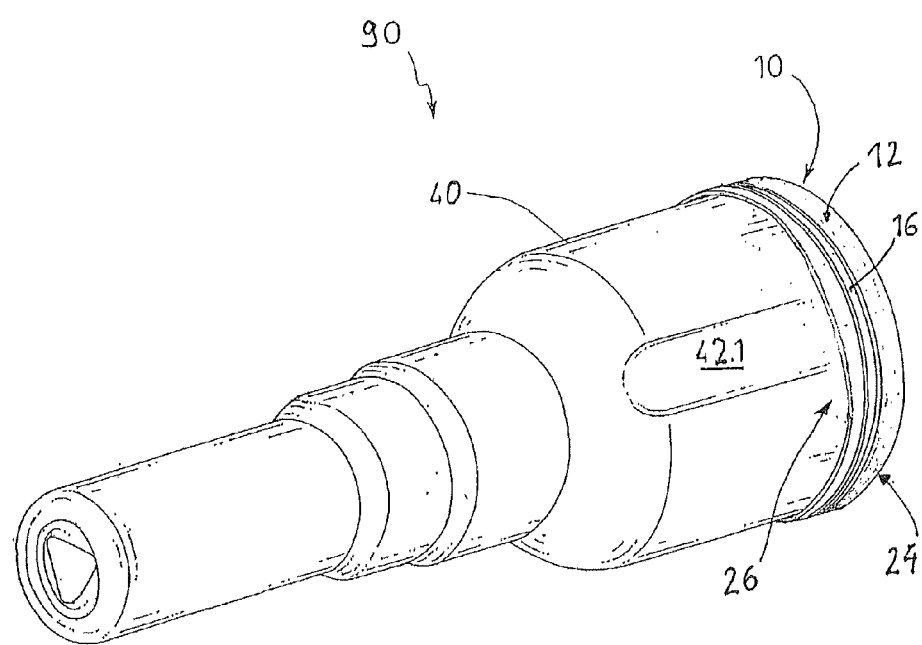
FIG. 1 is a perspective view of a joint casing with an adapter ring being part of the claimed folding bellows arrangement of the present disclosure.

It should firstly be noted that the features shown in the Figures are not restricted to the individual embodiments; in fact, the features shown and specified in each case in the description including the description of the drawings may be combined with one another in order to define the invention. In the figures, alike reference numbers are used to identify identical components in the various views and embodiments. Further, the subject matter of the present invention is not restricted to the embodiments of the folding bellows, the adapter ring or the groove of the joint outer part as shown in the drawings. In particular, in the joint collar region of the folding bellows more than one bead and one slit may be arranged, and, further, more than one first sealing lip may be present on the inner area of the adapter ring. Finally, a restriction to tripod joints in automobiles is neither provided nor desired. In effect, the arrangement according to the present disclosure may also be used in a multiplicity of fields of applications.

In the following detailed description, especially orienting terms are used such as "left", "right", "middle", "inner", "outer", "next to", "underneath", and the like. It has to be understood that these terms are used for convenience of the description of the components and embodiments by reference to the drawings. These terms do not necessarily describe the absolute location in space, such as upward, downward, left, right etc., that any part must assume. Further, in the following description, various operating and numerical parameters and components are described for several constructed embodiments. These specific parameters and components are included as examples and are not meant to be limiting. In that respect, it is especially referred to the parameter ranges explicitly disclosed in the general description of the present disclosure.

The folding bellows usable in the arrangement in accordance with the present disclosure as well as the adapter ring are usually made of a thermoplastic elastomer material or mixtures of thermoplastic elastomer materials, for examples based on polyurethane (TPU), polyamide (TPA), polyolefines (TPO) polyester (TPEE) or a thermoplastic elastomer vulcanisate (TPV) or a thermoplastic poly-ether-ester-elastomer (TEEE). The materials or mixtures of materials of the folding bellows or adapter rings in accordance with the present disclosure may be made of or may further comprise other materials, especially additives like diffusion-promoting admixtures or any other additives a person skilled in the art will be aware of in view of the use of the folding bellows and adapter rings in question, especially in view of the demands in the automotive industry, if the folding bellows and/or adapter rings are used for automotives. However, the folding bellows and/or adapter rings in accordance with the present disclosure may also be made of usual rubber-elastic materials, including mixtures thereof. It is not excluded within the sense of the present disclosure that the materials used for the folding bellows are different from the materials used for the adapter rings.

Advantages are provided by thermoplastic elastomer materials. These include materials known from the prior art with different polymer segments, namely a relatively rigid resin segment and an elastic soft segment. The individual polymer segments are comprised of longer chains of similar monomers. The resin segments hold the soft segments together by physical, network-like bonds. A thermoplastic elastomer material for manufacturing folding bellows in accordance with the present invention is a thermoplastic material marked under the brand name "Hytrel" by the DuPont company.

In another aspect of the disclosure, the joint binder seat region and a corresponding shaft binder seat region by which the folding bellows may be mounted on the joint outer part and/or shaft, is at least partially manufactured of an elastomer material. In contrast to thermoplastic elastomer materials, an elastomer material has the advantage of having a reduced so-called "cold flow" when situated underneath a binder (or fastening) element. This cold flow is understood to be the phenomenon in which, when subjected to clamping or compression stress, the plastic material in the joint collar and/or in a shaft collar region "escapes" literally from the binder element, as a result of each the folding bellows come loose during operation, particularly when under thermal stress. This is the reason why the adapter rings in accordance with the present disclosure are preferably at least partially manufactured of an elastomer material, most preferably manufactured of an elastomer material in total. Other regions of the joint binder seat region and the shaft binder seat region of the folding bellows can nevertheless be manufactured of a thermoplastic elastomer material. A similar advantage can also be achieved, if a layer of a thermoplastic material is placed underneath the elastomer material in the joint binder seat region and/or shaft binder seat region of the folding bellows. Possible elastomer materials useful for the folding bellows and/or adapter ring in accordance with the present disclosure include, for example, polyurethane rubber, polyester-based polyurethane/rubber mixtures or polychloroprenes.

The folding bellows used in the arrangement in accordance with the present disclosure may be produced using a press blower injection blow molding process, however, the folding bellows may also be produced with an injection/intrusion process, in an injection molding process, in an injection/pressing process and/or an extrusion/blowmolding process. The press blower injection blow molding process and the injection/intrusion process are advantageously used, because precisely-dimensioned boots may be produced by the processes. The adapter rings of the arrangement in accordance with the present disclosure are preferably produced by an injection/extrusion process.

The binder element may be selected from each kind of fasteners known from the prior art, such as clamping elements, especially clamping straps, but also clamps or compression rings. Useful binder elements exhibit clamping and/or compression forces on the joint binder seat region and/or shaft binder seat region of the folding bellows.

Finally, it must be stated that the Figures are up to-scale Figures, so that parameters like angles $\alpha_1$, $\alpha_2$, $\beta_1$, $\beta_2$ and heights $h_1$ and $h_2$ are directly derivable from the Figures.

Referring now to the drawings, FIG. 1 illustrates a perspective view of a joint outer part 40 with a mounted adapter ring 10 forming system 90. Adapter ring 10 may be premounted on the joint outer part 40, and the folding bellows not shown in FIG. 1 is mountable after having adapter ring 10 mounted on joint outer part 40. Joint outer part 40 shows lobed regions, of which FIG. 1 illustrates lobed region 42.1. Joint outer part 40 is embodied as a tri-lobed joint part, thus, two further lobed regions 42.2 and 42.3 not shown in FIG. 1 are present, being symmetrically distributed above the outer surface of the joint outer part 40. Adapter ring 10 provides for an outer surface 12 with a groove 16. Further, adapter ring 10 has a front part 24, that may at least in part surround a front edge 52 and/or front side 54 of the joint outer part 40 not shown in FIG. 1, and a back part 26.

Figure 2A:
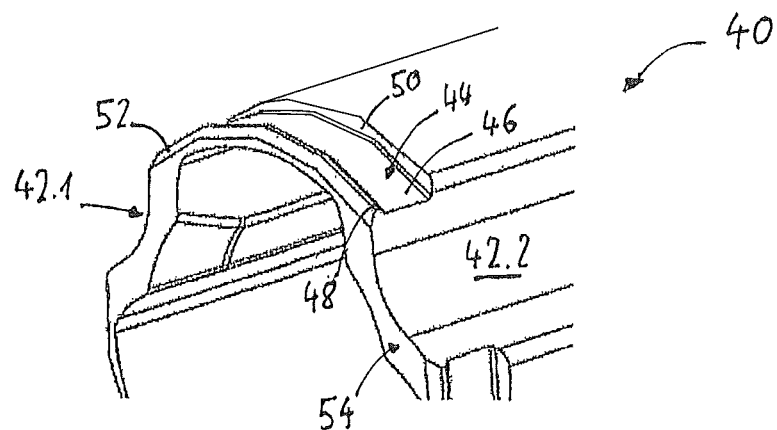
FIGS. 2A and 2B are a perspective view of a joint casing in accordance with FIG. 1, and a cross-sectional view of a mounted folding bellows arrangement, respectively, in accordance with the present disclosure.
Figure 2B:
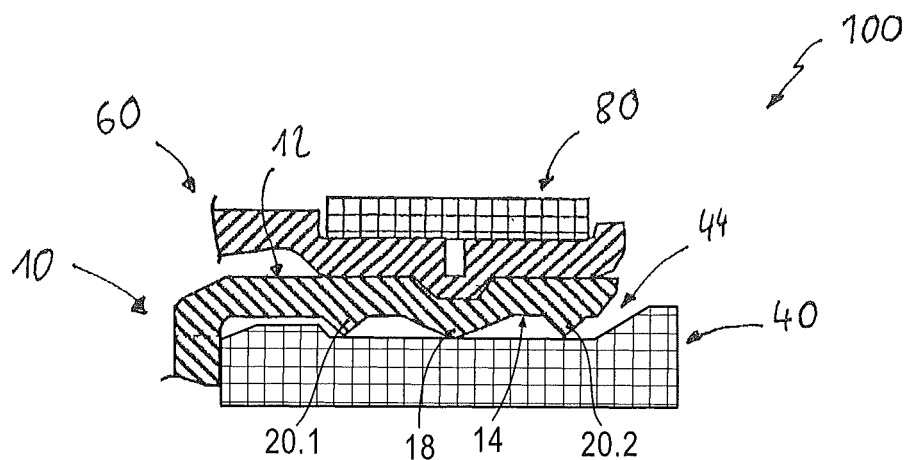

FIGS. 2A and 2B show in detail joint outer part 40 without a mounted adapter ring 10. One may clearly derive from FIGS. 2A and 2B that joint outer part 40 has a groove 44 of a tulip-like shape, that may also be named trapezoidal. The groove 44 has an outer side wall 48 and an inner side wall 50 slanting towards a ground 46 of said groove 44. The groove 44 is arranged beneath the front edge 52 of said joint outer part 40. Neighbouring the front edge 52, the front side 54 of the joint outer part 40 is located. One may further derive two lobed regions 42.1 and 42.2 of the joint outer part 40 from FIGS. 2A and 2B.

Further, FIG. 2B shows the relation of arrangement 100 in accordance with the present disclosure, shown in a cross-sectional view, with respect to the joint outer part 40, in a mounted state. The arrangement 100 comprises a binder element 80 arranged on a folding bellows 60, being in turn arranged on an outer surface 12 of the adapter ring 10. The adapter ring 10 in turn is arranged on the joint outer part 40 in that a first sealing lip 18 and two second sealing lips 20.1 and 20.2 arranged for on the left and right side with respect to the first sealing lip 18 lie within said groove 44 of the joint outer part 40. The first sealing lip 18 and the two second sealing lips 20.1 and 20.2 are arranged on an inner area 14 of the adapter ring 10. The inner area 14 refers more or less to the groove 44 of the joint outer part 40.

Figure 3:
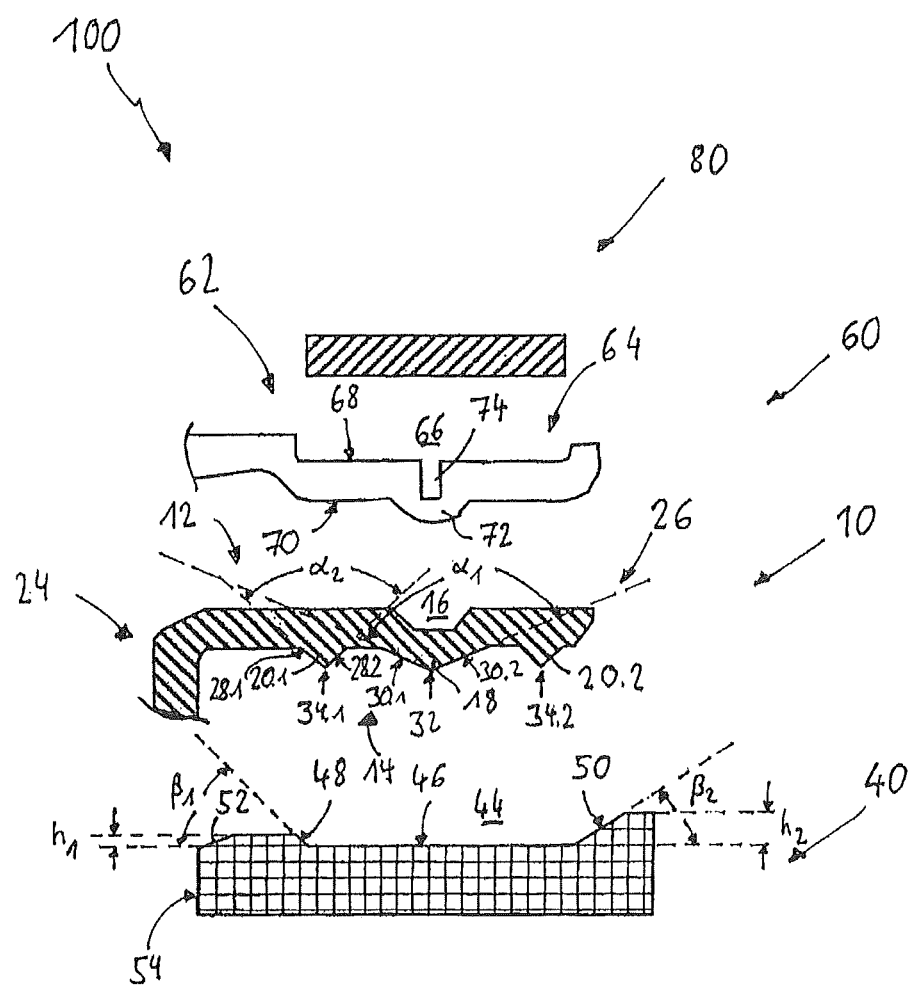
FIG. 3 is a cross-sectional explosive view of a folding bellows arrangement in accordance with the present disclosure.

FIG. 3 shows arrangement 100 in a cross-sectional, but exploded view in accordance with the embodiment already shown in FIG. 2. The folding bellows 60 provides for a joint collar region 62 for mounting the folding bellows 60 on the joint outer part 40 by way of the binder element 80. The joint collar region 62 comprises a joint binder seat region 64 for retaining the binder element 80, the binder seat region 64 providing for an outer surface 68 and an inner surface 70 directed towards the adapter ring 10. The joint collar region 62, thus, provides for a groove 66. From the outer surface 68 from the joint binder seat region 64, a circumferential slit 74 extends towards the adapter ring 10. Corresponding to the circumferential slit 74 is a circumferential bead 72 arranged on the inner surface 70 of the joint binder seat region 64. The bead 72 may be arranged in the middle of the joint binder seat region 64. The slit 74 shows a depth greater than its width, the depth being nearly two times the width of the circumferential slit 74. The circumferential bead 72, in a cross-sectional view, has a nearly half-round shape.

The adapter ring 10 on the outer area 12 shows a groove 16 having in a cross-sectional view a nearly trapezoidal shape with identical slanting angles with respect to the services of its side walls. Between the front part 24 and the back part 26 of the adapter ring 10, and shifted towards to the back part 26, the groove 16 is arranged. On the inner area 14 of the adapter ring 10, the two second sealing lips 20.1 and 20.2 as well as the first sealing lip 18 are arranged. The first sealing lip 18 provides for first side areas 30.1 and 30.2, between the surfaces of which a first angle $\alpha_1$ being around 130 degrees is formed. The first sealing lip 18 further comprises a tip 32, thus, is, in a cross-sectional view, of a triangular shape.

Also the two second sealing lips 20.1 and 20.2 are of a triangular shape comprising tips 34.1 and 34.2. Second sealing lips 20.1 and 20.2 provide for side walls 28.1 and 28.2, between the surfaces of which an angle $\alpha_2$ is defined, being identical for both second sealing lips 20.1 and 20.2. However, in the sense of the present disclosure, angle $\alpha_2$ referring to the second sealing lips may also deviate from each other.

One may easily derive from FIG. 3 that outer side wall 48 and outer side wall 50 of the groove 46 of the joint outer part 40 are slanting towards ground 46 of the same. The slanting angle $\beta_1$ being measured as defined in FIG. 3 is around 43 degree, whereas slanting angle $\beta_2$ as defined in FIG. 3 and referring to the inner side wall 50 is around 36 degree. Further, height $h_1$ referring to outer side wall 48 and measured as defined in FIG. 3 is only a third compared to a height $h_2$ referring to inner side wall 50 measured as defined in FIG. 3. Further, one may derive from FIG. 3 that front edge 52 of the joint outer part 40 is chamfered.

Figure 4:
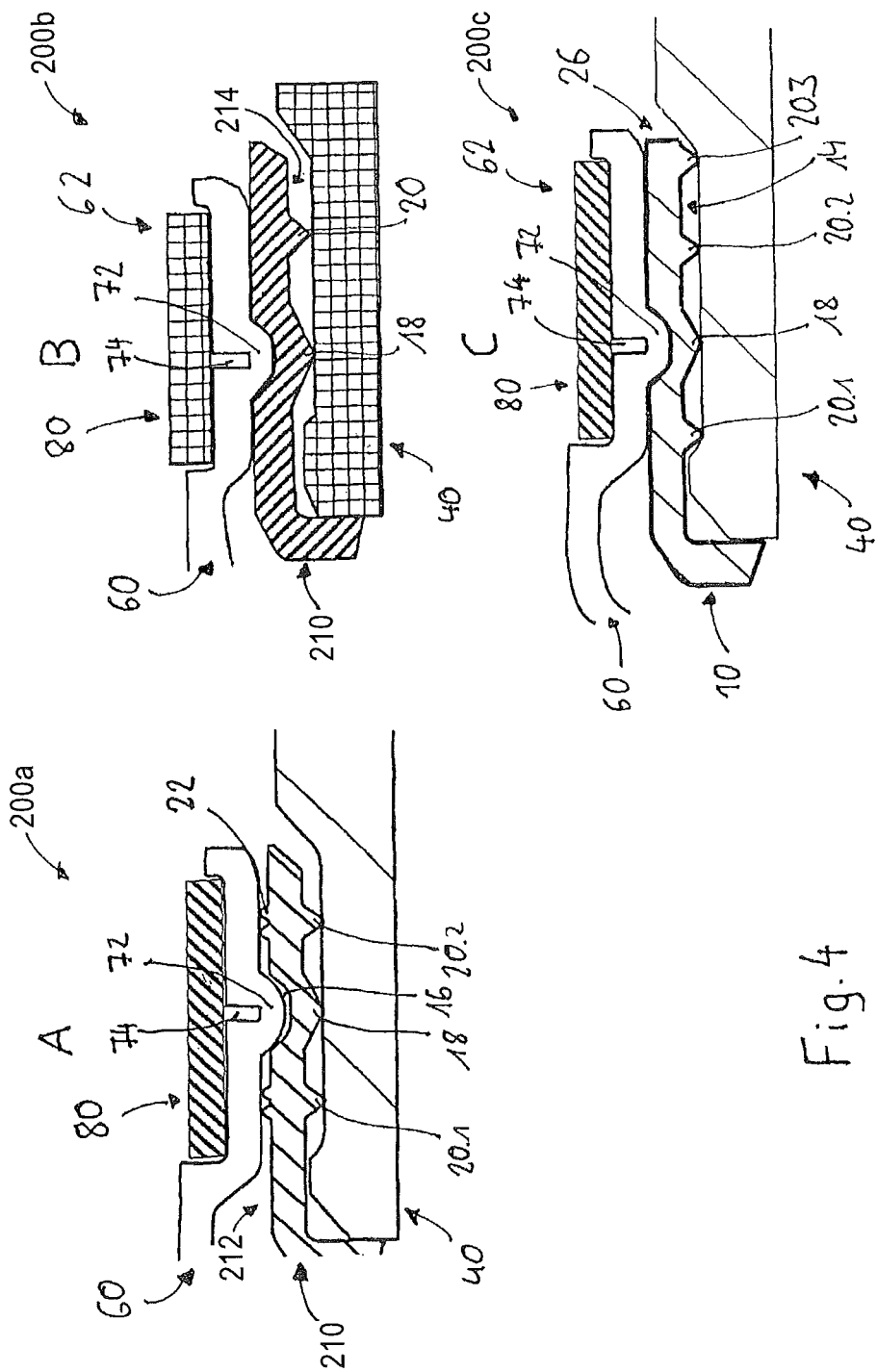
FIGS. 4A to 4C show in a cross-sectional view, alternative embodiments of a folding bellows arrangement in accordance with the present disclosure.

FIGS. 4A, 4B, and 4C now show further possible alternative embodiments 200a, 200b, and 200c of the arrangement in accordance with the present disclosure. In the following only differences between the embodiments 200a, 200b, and 200c shown in FIGS. 4A to 4C with respect to the embodiment 100 shown in FIGS. 2 and 3 are described. The embodiment 200a shown in FIG. 4A is similar to the embodiment 100 shown in FIGS. 2 and 3, however, on an outer surface 212 of adapter ring 210 four additional outside sealing lips 22 are arranged. The outside sealing lips 22 are arranged in two pairs, and are located with respect to a mounted arrangement 100 on the left and on the right, nearly symmetrically, with respect to groove 16 of the adapter ring 210 as well as a circumferential bead 72 of folding bellows 60. Further, in a cross-sectional view, said outside sealing lips 22 have a nearly triangular shape, however, the dimensions are much smaller than the dimensions of inside second sealing lips 20.1 and 20.2 arranged opposite to the outside sealing lips 22.

The embodiment 200b shown in FIG. 4B in contrast to the arrangement 100 shown in FIGS. 2 to 3 show only one second sealing lip 20 located on an inner area 214 of adapter ring 210. Further, first sealing lip 18 as well as the corresponding groove 16 of said adapter ring 210 as well as the corresponding circumferential bead 72 of folding bellows 60 are shifted towards the left when referred to joint collar region 62 of folding bellows 60. The same also holds with respect to the arrangement of circumferential bead 72 of folding bellows 60.

FIG. 4C shows a further embodiment 200c of arrangement 100 now showing three second sealing lips 20.1, 20.2 and 20.3 arranged on an inner area 214 of adapter ring 210. First sealing lip 18 is located nearly symmetrically in the middle between second sealing lips 20.1 and 20.2, however, being shifted towards the left when referred to joint collar region 62 of folding bellows 60. The same also holds with respect to the arrangement of circumferential bead 72 of folding bellows 60. In a cross-sectional view, the shape of all three second sealing lips 20.1, 20.2, and 20.3 is identical.

In all embodiments of the present disclosure shown by example in the drawings, due to the arrangement of all sealing means within a tulip-like groove of a joint casing, the total diameter of the arrangement in accordance with the present invention is decreased compared to the arrangement known from the prior art, where at least sealing means in part are arranged on the outer surface of joint outer casing outside the groove of said joint outer casing.

While the inventive arrangement and adapter ring have been described in connection with one or more embodiments, that disclosure is not meant to be limiting. Rather, the invention covers all alternatives, modifications and equivalents within the spiritual scope of the appended claims taking into account the description.

The invention claimed is:

1. A folding bellows arrangement for a tripod joint unit, comprising:
   a joint outer part with a groove,
   a folding bellows with a joint collar region for attachment to said joint outer part, said joint collar region comprising a joint binder seat region, and
   an adapter ring with an inner surface that is matching in a cross section to an outer contour of said joint outer part,
   wherein on an inner area of said joint collar region and within said joint binder seat region of said folding bellows at least one bead is arranged, said bead matching a groove arranged on an outer area of said adapter ring, wherein said groove of said adapter ring corresponds to an at least one first sealing lip arranged on an inner area of said adapter ring, and wherein on said inner area of said adapter ring at least one second sealing lip is arranged, said first and second sealing lips being arranged within said groove of said joint outer part, whereby, in a cross-sectional view, an angle $\alpha_1$ between surfaces of two side areas of said first sealing lip forms a tip, said tip being directed towards said groove of said outer joint part, is larger than a corresponding angle $\alpha_2$ between surfaces of two side areas of said second lip.

2. The folding bellows arrangement according to claim 1, wherein at least two second sealing lips are arranged on said inner area of said adapter ring.

3. The folding bellows arrangement according to claim 2, wherein said first sealing lip is arranged between at least two second sealing lips.

4. The folding bellows arrangement according to claim 2, wherein said first and second sealing lips in a cross-sectional view are a triangular shape.

5. The folding bellows arrangement according to claim 1, wherein said bead of said joint collar region is arranged in the middle of said joint binder seat region.

6. The folding bellows arrangement according to claim 1, wherein said angle $\alpha_1$ of said first sealing lip is an obtuse angle.

7. The folding bellows arrangement according to claim 1, wherein said groove of said joint outer part has a tulip-like shape.

8. The folding bellows arrangement according to claim 1, wherein a height $h_1$ of an outer side wall of said groove of said joint outer part is lower than a height $h_2$ of an inner side wall.

9. The folding bellows arrangement according to claim 8, wherein said outer and said inner side wall, in a cross-sectional view, are slanting towards a ground of said groove.

10. The folding bellows arrangement according to claim 9, wherein a first slanting angle $\beta_1$ between said outer side wall and said ground is larger than a second slanting angle $\beta_2$ between said inner side wall and said ground.

11. The folding bellows arrangement in accordance with claim 1, further comprising at least one binder element and/or a shaft.

\* \* \* \* \*